(No Model.)

W. L. E. KEUFFEL.
SLIDE RULE.

No. 603,695. Patented May 10, 1898.

WITNESSES:
James T. Brown
Herman Meyer

INVENTOR
Wm. L. E. Keuffel
BY William R. Baird
ATTORNEY

THE NORRIS PETERS CO., PHOTO-LITHO., WASHINGTON, D. C.

UNITED STATES PATENT OFFICE.

WILLIE L. E. KEUFFEL, OF HOBOKEN, NEW JERSEY.

SLIDE-RULE.

SPECIFICATION forming part of Letters Patent No. 603,695, dated May 10, 1898.

Application filed January 6, 1897. Serial No. 618,126. (No model.)

*To all whom it may concern:*

Be it known that I, WILLIE L. E. KEUFFEL, of Hoboken, in the county of Hudson and State of New Jersey, have invented certain new and useful Improvements in Slide-Rules; and I do hereby declare the following to be a full, clear, and exact description of the invention, such as will enable others skilled in the art to which it appertains to make and use the same.

The use of slide-rules has become widely extended within the past few years. Without describing more particularly the manner of their graduation or the methods of using them it may briefly be stated that each slide-rule consists of a suitably and logarithmically graduated rule provided with a suitably-graduated slide, and when the readings on the rule and the slide are brought into certain relations that certain other readings thereby indicated enable the easy and rapid solution of otherwise complex mathematical problems. Such rules are used in performing repeated calculations, such as ascertaining the horse-power of a fall of water, the flow of liquids in pipes, the average pressure of steam, the horse-power of engines, and the like. A demand has therefore arisen for slide-rules so graduated that certain calculations can be made without the use of many separate instruments; and the object of my invention is to produce a slide-rule having a number of faces suitably graduated whereby the several faces may be used for the solution of different problems or series of related problems. To this end I make a slide in the form of a prism having three, four, five, or more faces, as the case may be, and I make the rule in the form of a prismatic frame having a number of sides corresponding to the number of the faces of the slide and adapted to inclose or surround the slide, a portion of each face of the frame being cut away to permit of the observation of the slide, the interior angles of the rule corresponding to the exterior angles of the slide serving as an exact guide therefor, so that the relative positions of the graduations on the corresponding faces may remain constant.

In the accompanying drawings I have illustrated what I consider the best means of carrying out my invention.

Figure 2:
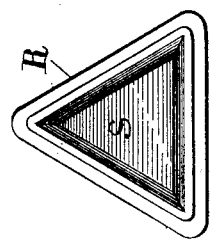
Figure 1:
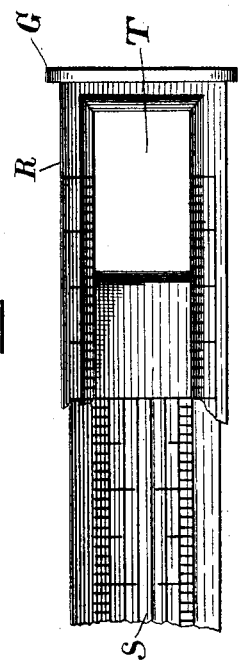
Figure 3:
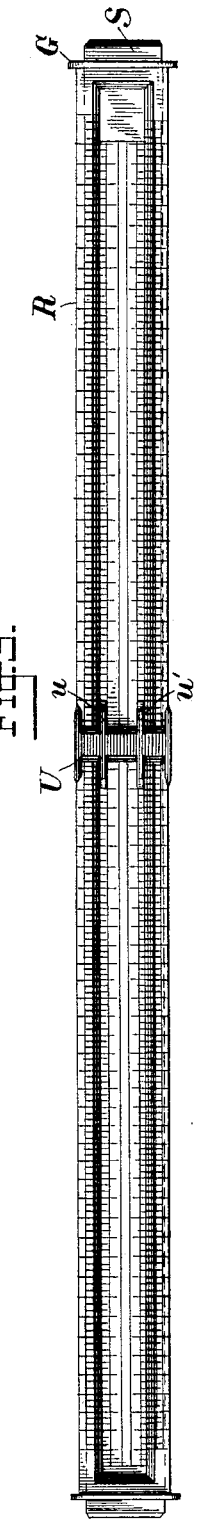
Figure 4:
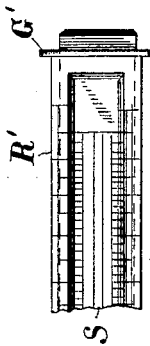

In the drawings, in which the same letters of reference refer to similar parts in all of the views, Figure 1 is an enlarged front elevation of one end of my improved slide-rule. Fig. 2 is an end elevation of the same, and Fig. 3 is a reduced elevation showing the relative lengths of the slide and rule and the position of the runner or indicator. Fig. 4 is a side elevation of one end of a quadrangular prismatic slide-rule, and Fig. 5 an end elevation of one end thereof.

As those skilled in the art to which my invention relates understand the principles governing the graduating of the slide and the rules and the relations which such graduations bear to each other, I will not complicate this description with any reference thereto, simply contenting myself with the statement that each edge of the rule and each face of the slide is suitably and logarithmically graduated, and will confine the description of my device to its mechanical features.

In the drawings, S is a slide in the form of a triangular prism, each face of which is centrally suitably graduated.

R is a rule made in the form of a triangular prismatic frame.

The central portion of each face corresponding in area to the space allotted for displaying the graduations on the slide S is cut away, as at T, so as to permit of the observation of such graduations. The two edges of each angle of the frame of the rule are suitably graduated, the graduations in each case extending down to the edge of the elongated aperture T, so that corresponding demarcations on the slide and rule appear to the eye as continuous lines when their edges are brought together, the interior angles of the rule corresponding to the exterior angles of the slide serving as an exact guide therefor, so that the relative positions of the graduations on the corresponding faces may remain constant. An indicator or runner U, fitting snugly over the rule completely or partially encircling it and adapted to slide its entire length, is provided with one or more fins or projections, as $u$ and $u'$, to enable corresponding points on any scale to be noted. The indicator may be made of different materials and with or without the fins referred to; but I show the construction which I prefer.

I prefer to make the slide slightly longer than the rule, as shown in Fig. 3, so that it may be more readily moved by the operator. At each end of the slide-rule the frame is expanded and made to project beyond the edges of the prism, forming a guard G, so that when the instrument is placed upon a plane surface the graduated edges are prevented from touching and becoming scratched or injured. Such construction also stiffens the rule at the ends and permits of a better hold in handling.

The advantages of my invention are that it enables a number of slide-rules virtually to be combined in one. For instance, one face of the slide and the corresponding inclosing edges of the rule may be graduated for the solution of arithmetical problems, another face of the slide and the corresponding edges of the rule may be graduated and adapted to the solution of problems in hydraulics, and so on.

Figure 5:
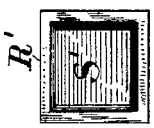

I have illustrated in Figs. 4 and 5 a modification of the device above described in which the slide S' is made with four faces and the rule R' with corresponding edges, the rule being provided with a guard G', as before. In a similar manner modifications may be made in my invention without departing from its essential principles, which are applicable to a slide of any number of sides greater than two and to a rule having corresponding angles. In fact, as a prism of many sides is in effect a cylinder my invention may be contained in a cylindrical slide suitably graduated surrounded by a cylindrical rule suitably graduated and provided with apertures through which the graduations on the slide are visible; but in such case other means must be provided for accurately guiding the slide in the rule.

Having described my invention, what I claim as new is—

1. In a calculating slide-rule, an angular rule having an interior chamber and a plurality of faces provided with longitudinal cut-out portions communicating with said chamber and having its opposite edges logarithmically graduated, external guards on the ends of said rule, and a prismatic slide inclosed by said rule and working within said chamber, the ends of said slide being projected beyond the ends of said rule, said slide displaying suitable logarithmic graduations, the interior angles of the rule and exterior angles of the slide forming means for accurately adjusting said slide within said rule, substantially as set forth.

2. In a calculating slide-rule having a plurality of faces provided with longitudinal cut-out portions and having its opposite edges logarithmically graduated, external guards on the ends of said rule, a prismatic slide inclosed within said rule and displaying suitable logarithmic graduations, and an indicator or runner adapted to slide longitudinally over said rule and provided with a plurality of fins or pointers located over said slide, and extended in opposite directions, substantially as set forth.

3. In a calculating slide-rule having a plurality of faces provided with longitudinal cut-out portions and having its opposite edges logarithmically graduated, external guards on the ends of said rule, a prismatic slide inclosed within said rule and displaying suitable logarithmic graduations, and an indicator or runner entirely or partly encircling said angular rule and having a plurality of fins or pointers extending over the exposed faces of said slide in opposite directions, substantially as set forth.

In testimony whereof I have signed this specification in the presence of two subscribing witnesses.

WILLIE L. E. KEUFFEL.

Witnesses:
H. REICHY,
PR. BROSSCH.